(12) United States Patent
Bolstad et al.

(10) Patent No.: US 6,399,239 B2
(45) Date of Patent: *Jun. 4, 2002

(54) BATTERY SYSTEM

(75) Inventors: James J. Bolstad, Shorewood; James T. Daley, Grafton; James A. Lenz, Oconomowoc; Michael G. Andrew, Menomonee Falls; Thomas J. Dougherty, Waukesha; Edward N. Mrotek, Grafton, all of WI (US)

(73) Assignee: Johnson Controls Technology Company, Plymouth, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/232,543

(22) Filed: Jan. 18, 1999

Related U.S. Application Data

(60) Provisional application No. 60/071,787, filed on Jan. 19, 1998.

(51) Int. Cl.[7] .......................... H01M 2/10; H01M 2/20; H01M 2/30
(52) U.S. Cl. .......................... 429/100; 429/96; 429/97; 429/121; 429/123; 429/179
(58) Field of Search .............................. 429/96, 97, 99, 429/100, 121, 123, 178, 179

(56) References Cited

U.S. PATENT DOCUMENTS

| | | | |
|---|---|---|---|
| 3,989,544 A | 11/1976 | Santo | 429/65 |
| 4,657,335 A | 4/1987 | Koch et al. | 339/256 R |
| 4,734,063 A | 3/1988 | Koch et al. | 439/844 |
| 4,740,178 A * | 4/1988 | Badenhorst et al. | 439/758 |
| 5,225,294 A * | 7/1993 | Schifrin | 429/99 |
| 5,432,019 A | 7/1995 | Hue | 429/10 |
| 6,023,146 A | 2/2000 | Casale et al. | 320/112 |
| 6,051,336 A | 4/2000 | Dougherty et al. | 429/149 |

FOREIGN PATENT DOCUMENTS

| | | | |
|---|---|---|---|
| DE | 3150652 A1 | 6/1983 | B60K/1/04 |
| FR | 2715764 | 8/1995 | H01H/35/14 |
| GB | 1569967 | 6/1980 | H01M/2/10 |
| GB | 2042242 A | 9/1980 | H01M/10/44 |
| GB | 2115601 A | 9/1983 | H01M/2/02 |
| JP | 59008266 | 1/1984 | H01M/2/10 |
| JP | 61039364 | 2/1986 | H01M/2/30 |
| JP | 05012515 | 1/1993 | G06K/19/077 |
| JP | 07094159 | 4/1995 | H01M/2/10 |

OTHER PUBLICATIONS

KonneKtech Publication, "Electrosource, Battery-to-Battery Interconnections Featuring Radsock High Amperage Electrical Connectors" (Jun. 1995).

* cited by examiner

Primary Examiner—Gabrielle Brouillette
Assistant Examiner—Jonathan Crepeau
(74) Attorney, Agent, or Firm—Foley & Lardner

(57) ABSTRACT

A battery system includes a battery with a pair of terminals extending from one side of the battery case, and a tray-like battery holder. The terminals have hollow sockets inserted therein which are engaged by posts extending from conductive plugs that extend through an end wall of the holder. A threaded connection is formed in the plug and opens to the outside of the holder. Alignment posts are formed in the holder to be disposed within cylindrical wells in the bottom of the battery case and ensure proper alignment of the battery in the holder. A hinged latch is formed in the holder and engages a projection on the battery case. When in place in the holder, the battery case rests on resilient pads located on a floor of the holder.

33 Claims, 3 Drawing Sheets

BATTERY SYSTEM

This application claims the benefit of U.S. provisional application No. 60/071,787, filed Jan. 19, 1998.

BACKGROUND OF THE INVENTION

This invention relates to electric storage batteries, and particularly to a quick connection and mounting of the battery within a holder.

Most present automotive batteries, used for starting the engines, use the familiar SAE-type lead post terminals. Such terminals usually require a lead ring-type connector on the cable. The lead ring is typically tightened by means of a nut and bolt, thereby requiring tools for installation and resulting in a relatively difficult and inconvenient installation process.

It is the object of this invention to provide an engine starting battery and holder for the battery in which the battery may be easily plugged in and snapped into the holder without the use of tools. The action completes the necessary electrical contact of the battery terminals to the electrical system of the automobile and also securely mounts the battery.

SUMMARY OF THE INVENTION

According to the invention, a battery has a case with terminal extensions with sockets. A battery holder has conductive plugs with posts that are received within the sockets as the battery is placed into the holder. Preferably, releasable interengaging projections on the battery case and the holder engage to lock the battery in the holder.

The holder is formed as a tray with the plugs disposed in one end wall of he tray and with a living hinge formed in the opposite and adjacent end walls of he tray. The plugs include posts that are received in aligned sockets in terminal extensions on the battery case. A ledge projects from the end of the battery case opposite the terminal extensions and is received in a latch formed on the opposite hinged end wall of the tray.

In the preferred embodiment, the sockets are oriented with their longitudinal axes generally parallel to an end wall of the battery case and the posts extend normal to a floor of the tray. The plugs have an opening to receive a conductor connected to the electrical systems of the vehicle.

The invention resides in the battery, in the holder, and in a system comprising the battery and the holder.

The present invention eliminates the requirements for tools, increases the convenience for the installer, and decreases the likelihood of minor hand injuries or other injuries resulting from scraped or bruised knuckles, wrist strains, or electrical arcing caused by unintentional short circuiting of battery terminals by wrenches or other tools. The invention also facilitates charging and testing the battery without disconnecting it from the electrical system of the vehicle.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
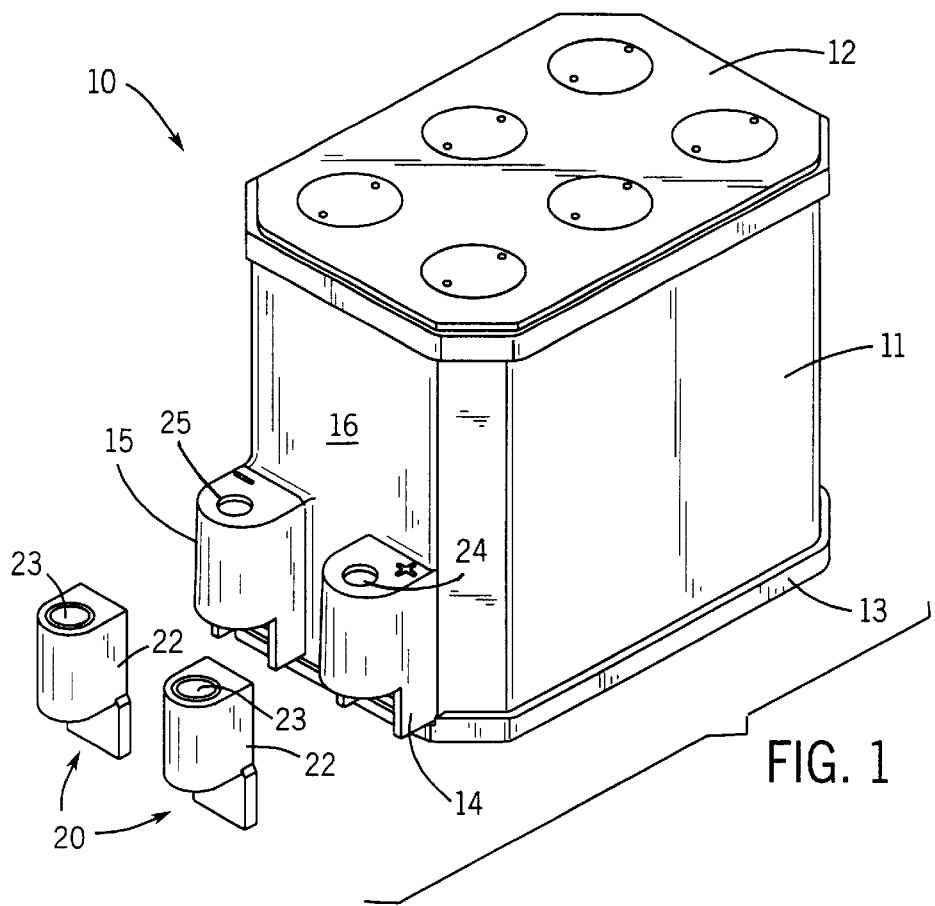
FIG. 1 is a partial exploded view in perspective of a battery in accordance with the present invention.
Figure 2:
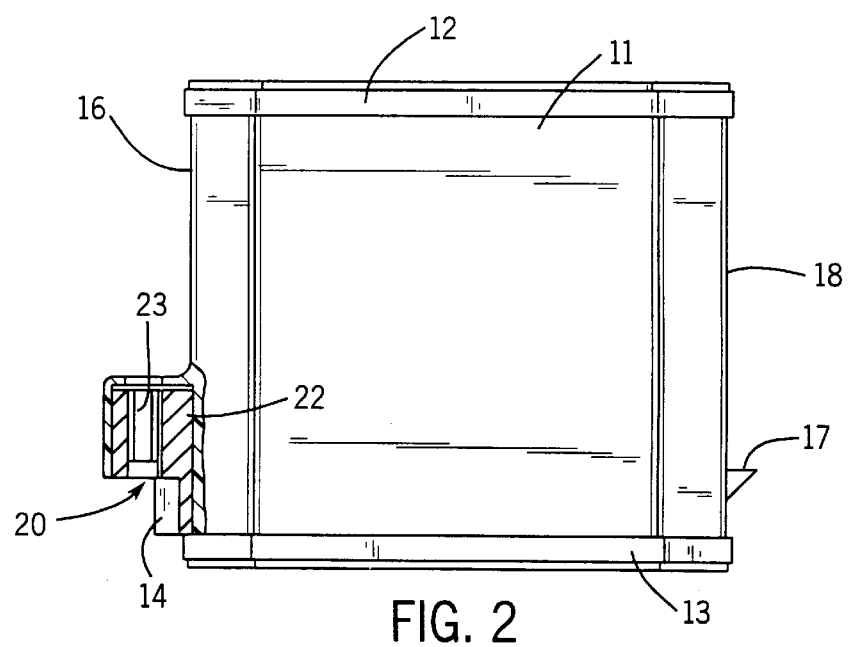
FIG. 2 is a side view of the battery of FIG. 1 with a terminal extension in vertical cross-section.
Figure 3:
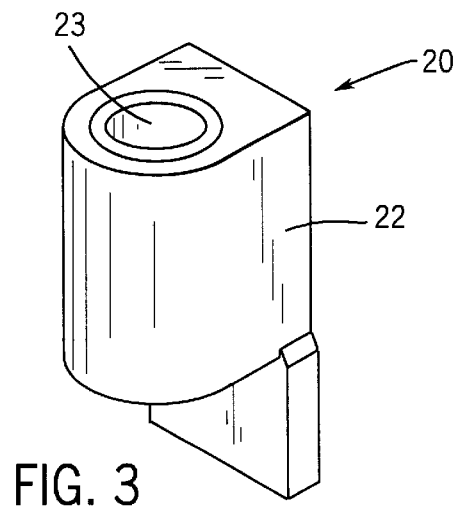
FIG. 3 is a view in perspective of a terminal socket that is mounted in the terminal extension.
Figure 4:
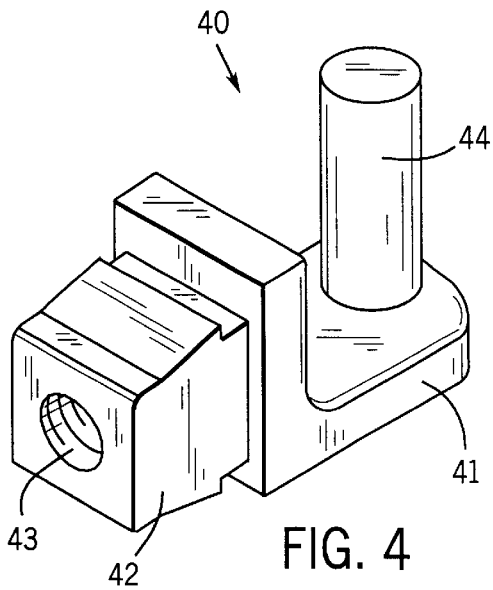
FIG. 4 is a view in perspective of a plug that mates with the socket.
Figure 5:
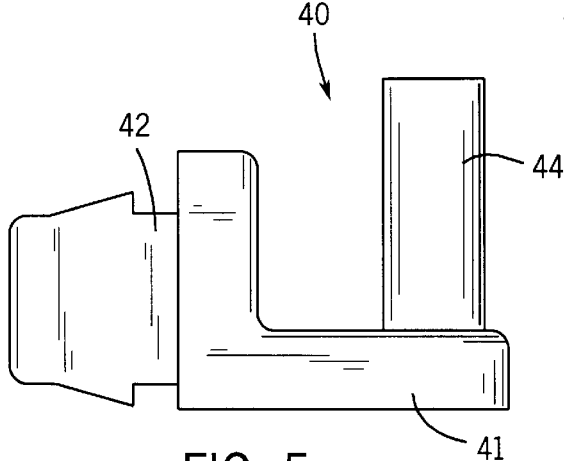
FIG. 5 is a side view of the plug of FIG. 4.
Figure 6:
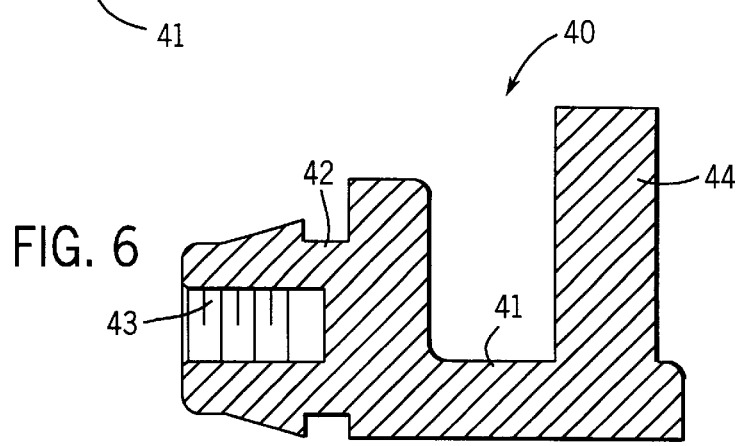
FIG. 6 is a view in vertical cross-section of the plug of FIGS. 4 and 5.
Figure 7:
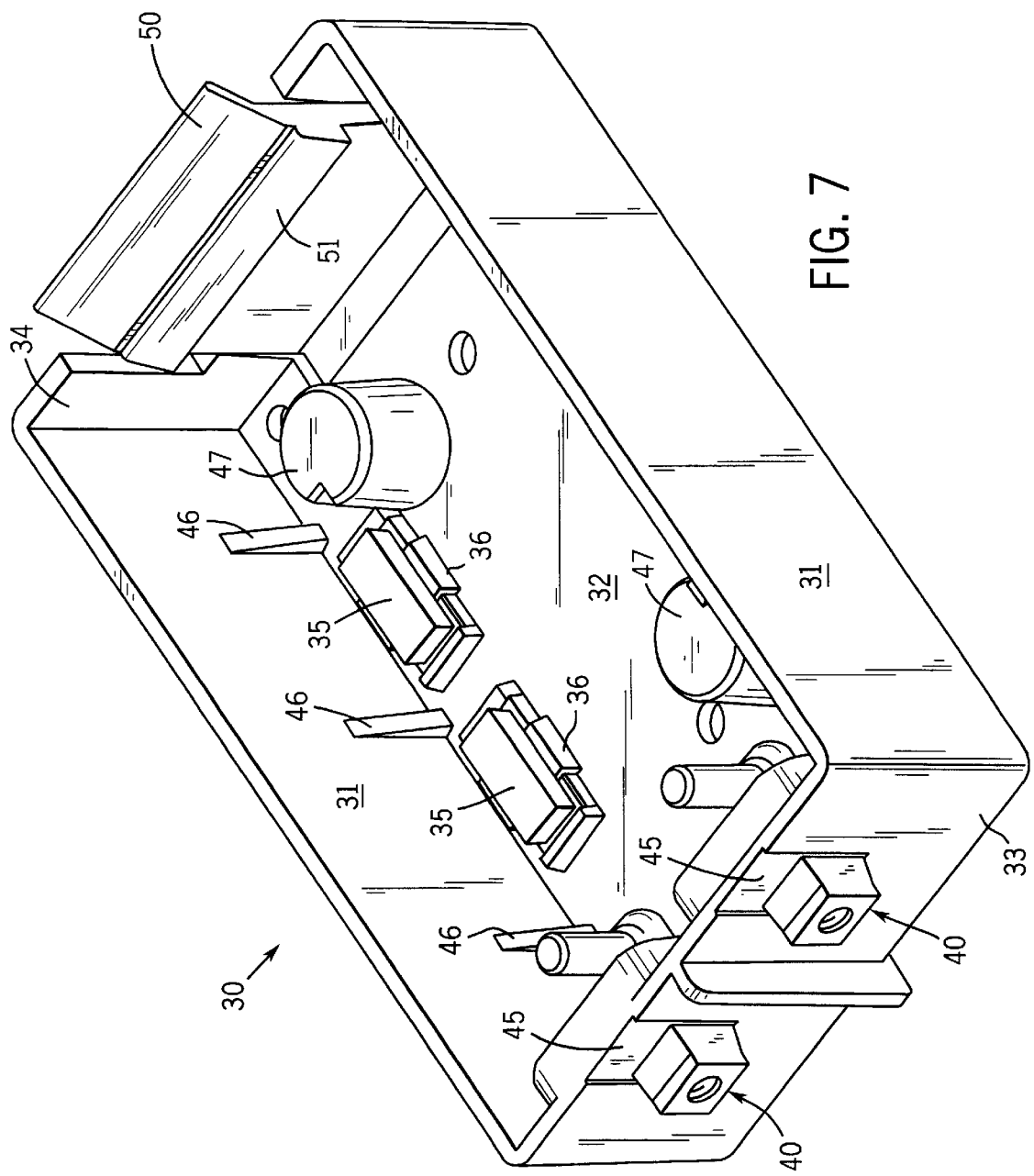
FIG. 7 is a view in perspective of the holder for the battery.

Referring to the drawings, the invention is shown in connection with a thin metal film lead-acid battery of the type that is illustrated and described in co-pending U.S. application Ser. No. 09/008,719 filed Jan. 19, 1998, now U.S. Pat. No. 6,051,336, and assigned to the assignee of this application. The disclosure of this co-pending application is incorporated herein by reference as though fully set forth herein.

The battery 10 has a case which contains a plurality of spirally wound thin metal film cells (not shown). The case includes a body 11, a top 12, and a bottom 13 that are heat sealed to the body 11. The body 11 includes integral, laterally projecting terminal housings 14 and 15 adjacent to the lower portion of an end wall 16. The body 11 also includes a projecting ledge 17 extending from the opposite end wall 18.

The cells within the body are serially connected to each other and to terminals 20 that are received in the terminal extensions 14 and 15. The terminals are each formed of a body 22 of lead or a lead alloy and a vertically aligned socket 23 is received in the body 22. The socket 23 is preferably a socket-type connector manufactured by Konnektech Corporation and marketed under the brand name RADSOK, a registered trademark. As seen from the drawings, the bottoms of the sockets 23 are open to the bottoms of the terminal extensions 14 and 15. Preferably, circular bores 24 and 25 are disposed in the terminal housings 14 and 15, respectively, to permit access to the sockets 23 from the top of the battery 10 case. The bores 24 and 25 allow the battery 10 to be connected to the electrical system of a vehicle by conventional cables (not shown) from the top of the battery 10. Also, the bores 24 and 25 allow battery diagnostic or charging equipment (not shown) to be connected to the sockets 23 without disconnecting the battery 10 from the vehicle's electrical system.

A holder indicated generally by the numeral 30 is formed as a tray with side walls 31, a floor 32, a front end wall 33 and a rear end wall 34. Four resilient pads 35 are mounted on the floor 32 at mounts 36. A pair of plugs 40 extend through the front end wall 33. The plugs 40 each have a base 41, a connector portion 42 that extends through the end wall 33 and terminates in a threaded opening 43, and an upright post portion 44. The post portion 44 is adapted to be received within the socket 23 of a terminal 20. The threaded opening 43 functions as a connection to a conductor leading to the vehicle electrical system. The plugs 40 are mounted flush against the non-beveled surfaces of the cut-outs 45 in the front end wall 33. The tray can be formed by molding about the plugs 40, or by inserting the plugs 40 through rectangular openings provided in the front end wall 33.

The side walls 31 are reinforced by gussets 46, spaced along the perimeter of the side walls 31. Two alignment posts 47 are formed within and protrude from the floor 32 near diagonally opposing corners of the tray 30. The alignment posts 47 are notched to allow space on the floor 32 for pad mounts 36 and are tapered for easy insertion into and removal from two cylindrical wells (not shown) disposed in the bottom 13.

The rear end wall 34 has a hinge portion 50 molded into the end wall with a projecting latch portion 51. The hinge portion 50 is formed as a "living hinge", which is well known to those skilled in the art of plastic parts design.

The battery 10 is inserted into the holder 30 from above with the posts 44 sliding into and being received in the sockets 23 in the terminals. The battery is inserted until it rests against the pads 35. The pads 35 can be compressed slightly until the latch portion 51 engages with the ledge 17 on the battery case. When so installed, the battery is securely mounted within the holder 30. However, it can be readily released by grasping the hinge portion 50 to release the latch 51 from the ledge 17, thereby allowing the battery to be withdrawn from the holder.

The terminals 20 are preferably cast from lead or a lead alloy and the socket connector 23 is insert molded in place. The socket 23 is preferably plated with a nickel strike and subsequently with a lead-tin alloy for corrosion resistance to acid and salt spray. The terminals 20 may be extrusion/fusion welded to an adjacent lead strap of a cell. A rubber gasket (not shown) treated with silicone or flouro-silicone oil extends around an opening in the end wall 16 through which the welding can be accomplished. The plug 40 is preferably cast in one piece from brass or copper alloy and is also plated with a nickel strike followed by lead-tin alloy plating for corrosion resistance. A battery cable can be attached to the plugs 40 by a screw utilizing the threaded opening 43 in the plugs 40 to complete the electrical connection to the vehicle electrical systems.

Although the battery is shown as being inserted vertically into the holder, the holder and its plug could be designed to accommodate a sliding of the battery into the holder at any angle, including horizontal and vertical.

What is claimed is:

1. A battery system comprising a battery and a battery holder wherein:
   the battery has a case with extensions protruding outwardly from an end wall in which are disposed terminals that include hollow sockets;
   the holder has a releasable latch that engages with a protection on the battery case; and
   the holder has conductive plugs for connection to wires and which include posts that are received in the sockets when the battery is inserted into the holder.

2. The battery system of claim 1 wherein the holder is a tray, the plugs extend through one end wall of the tray, and the latch is formed in an opposite end wall or the tray.

3. The battery system of claim 2 wherein the holder has a floor together with resilient pads mounted on the floor and supporting the battery case in the holder.

4. The battery system of claim 3 wherein the sockets are oriented with their longitudinal axes generally parallel to the end wall of the battery case and the posts extend normal to the floor of the tray.

5. The battery system of claim 2 wherein the plugs each have a threaded hole opening to the outside of the tray.

6. The battery system of claim 1 wherein the sockets are insert molded into the terminals.

7. A battery system comprising a battery and a battery holder wherein:
   the battery has a case with terminal extensions in one or more sides of the case, each terminal extension mounting a terminal with a hollow socket;
   the holder is in the form of a tray with a floor and upright sides, and terminal plugs are mounted in one or more sides of the tray and include posts that are received in the sockets; and
   a latch which is mounted on the tray and releasably engages the battery case.

8. The battery system of claim 7 wherein the case is coupled to the holder when the latch is in a first position and the case is removable from the holder when the latch is in a second position.

9. The battery system of claim 8 wherein the latch is a living hinge.

10. The battery system of claim 8 wherein the latch is integral with the holder.

11. A battery holder for a battery having a terminal exterior to the battery housing and having a hollow socket in the terminal, said holder comprising:
    a tray with a floor and upright sides; and
    a conductive plug extending through one side of the tray, said plug having a post interior of the tray to receive the socket and a connection opening outside the tray for receiving a conductor wherein the axis of the post is perpendicular to the opening,
    wherein another side of the tray has a latch to engage the battery housing.

12. The battery holder of claim 11 wherein the connection opening is threaded.

13. The battery holder of claim 11 further comprising resilient pads oil the floor upon which the battery can rest.

14. A battery having a battery case with a pair of terminal extensions protruding outwardly from a wall of the battery case in which are disposed terminals having hollow sockets, wherein the terminal extensions open to the outside of the battery case and toward the bottom of the battery case and to the outside of the battery case and toward the top of the battery case.

15. The battery of claim 14, wherein the sockets open to the top and the bottom of the battery case.

16. A battery having a battery case with a pair of terminal extensions protruding outwardly from a wall of the battery case in which are disposed terminals having hollow sockets, wherein the sockets open to the outside of the battery case and toward the top of the battery case and to the outside of the battery case and toward the bottom of the battery case.

17. The battery of claim 16 wherein the terminal extensions open to the bottom of the battery case.

18. The battery of claim 16 wherein the terminal extensions open to the top of the battery case.

19. A battery system comprising:
    a battery including a case, at least one battery cell contained in the case, and a terminal integrally connected to at least one battery cell, the case including au extension protruding perpendicularly outwardly from an end wall of the case, the terminal including a hollow socket, the terminal being disposed in the extension such that the hollow socket opens generally parallel to the end wall of the case; and
    a battery holder including a conductive plug for connection to a wire, the plug including a post configured for insertion in the socket when the battery is placed into the holder.

20. The battery system of claim 19 wherein:
    the holder has a releasable latch that engages with a projection on the battery case.

21. The battery system of claim 20 wherein:

the holder is a tray, the plugs extend through one end wall of the tray, and the latch is formed in an opposite end wall of the tray.

22. A battery system comprising:

a battery including a case, at least one battery cell contained in the case, and a terminal exterior to the battery case, the terminal including a hollow socket; and a battery holder including a tray and a conductive plug, the tray having a floor and side walls extending upwardly from the floor, the plug extending through one side of the tray, the plug including a connection opening outside the tray for receiving a conductor, the plug including a post interior to the side walls of the tray to receive the socket when the battery is placed in the holder, the axis of the post being perpendicular to the floor of the tray.

23. The battery system of claim 22 wherein:

the axis of the post is perpendicular to the connection opening.

24. The battery system of claim 23 wherein:

the connection opening is a threaded opening.

25. The battery system of claim 22 wherein:

another side of the tray has a latch to engage the battery case.

26. A battery for use with the electrical system of a vehicle comprising:

a battery case including:

an extension protruding from the case;

at least one battery cell in the case;

a terminal having a socket nested at least partially in the extension and integrally connected to the at least one battery cell;

a battery tray Including a latch selectively configurable between a first position for retaining the battery case and a second position for releasing the battery case and also including a mounting interface configured to engage the socket of the terminal.

27. The battery of claim 26 wherein:

the socket opens to the bottom of the case.

28. The battery of claim 27 wherein:

the socket opens to the top of the case.

29. The battery of claim 26 wherein the extension is perpendicular to an end wall of the case.

30. The battery of claim 29 wherein the socket opens parallel to the end wall of the case.

31. The battery of claim 30 wherein the mounting interface is a vertical post.

32. The battery of claim 31 wherein the socket is configured to receive the post.

33. The battery of claim 32 wherein the socket is follow.

* * * * *

UNITED STATES PATENT AND TRADEMARK OFFICE
CERTIFICATE OF CORRECTION

PATENT NO. : 6,399,239 B2  Page 1 of 1
DATED : June 4, 2002
INVENTOR(S) : James J. Bolstad; James T. Daley; James A. Lenz; Michael G. Andrew; Thomas J. Dougherty and Edward N. Mrotek;

It is certified that error appears in the above-identified patent and that said Letters Patent is hereby corrected as shown below:

<u>Column 3,</u>
Line 47, delete "protection" and insert therefor -- projection --.
Line 53, delete "or" and insert therefor -- of --.

<u>Column 4,</u>
Line 32, delete "oil" and insert therefor -- on --.
Line 55, delete "au" and insert therefor -- an --.

<u>Column 6,</u>
Line 7, delete "Including" and insert therefor -- including --.
Line 24, delete "follow" and insert therefor -- hollow --.

Signed and Sealed this

Thirty-first Day of December, 2002

JAMES E. ROGAN
*Director of the United States Patent and Trademark Office*